United States Patent
Lorenzetti et al.

[11] Patent Number: 6,028,528
[45] Date of Patent: Feb. 22, 2000

[54] APPARATUS AND METHODS FOR MANAGING TRANSFERS OF VIDEO RECORDING MEDIA USED FOR SURVEILLANCE FROM VEHICLES

[75] Inventors: Leo Lorenzetti, Hamberg; Louis W. Blanco, Boonton, both of N.J.

[73] Assignee: Mobile-Vision, Inc., Boonton, N.J.

[21] Appl. No.: 08/957,649

[22] Filed: Oct. 24, 1997

[51] Int. Cl.⁷ .................. G06F 7/04; G06K 7/01
[52] U.S. Cl. .................. 340/825.31; 340/825.34; 348/5.5; 235/382.5
[58] Field of Search .......... 840/825.31, 825.34; 360/5; 348/153, 5.5, 143, 148; 701/35; 235/375, 382, 385; 380/23; 340/426

[56] References Cited

U.S. PATENT DOCUMENTS

| | | | |
|---|---|---|---|
| 5,111,289 | 5/1992 | Lucas et al. | 348/148 |
| 5,491,511 | 2/1996 | Odle | 348/153 |
| 5,764,769 | 6/1998 | Bennett et al. | 380/23 |

*Primary Examiner*—Hassan Kizou
*Assistant Examiner*—John Pezzlo
*Attorney, Agent, or Firm*—Thomas L. Adams, Esq.

[57] ABSTRACT

The apparatus can manage transfers of video recording media bearing machine readable registration codes. This media is adapted to record video from a vehicle-mounted camera. The management apparatus (and the methods) operate with a user identification key carrying at least one machine readable, identification code, as well as a supplemental code. The apparatus has a port for reading and writing to the key, a registration device, and a processor. The port can provide in response to the key, an identification signal and supplemental signal corresponding to the identification and supplemental code. The registration device can read the registration codes borne by the video recording media and can provide in response thereto a registration signal. The processor is coupled to the port and the registration device for (a) producing in response to the identification signal, a selection signal signifying an instruction to transfer that one of the video recording media bearing a selected one of the registration codes without requiring an intervening user selection, (b) verifying and recording the registration signal, and (c) writing the supplemental code through the port to the identification key. The management apparatus also includes a mobile system and a station system. The mobile system includes a video recorder, a remote port device, and a controller. The video recorder can record on the video recording media, video from the vehicle-mounted camera. The remote port device can (i) write the supplemental code to the key, and (ii) read the key and provide in response thereto, a remote identification signal corresponding to the identification code. The controller is coupled to the remote port device and the video recorder for controlling the video recorder in response to the remote identification signal.

61 Claims, 5 Drawing Sheets

APPARATUS AND METHODS FOR MANAGING TRANSFERS OF VIDEO RECORDING MEDIA USED FOR SURVEILLANCE FROM VEHICLES

BACKGROUND OF THE INVENTION

1. Field of Invention

The present invention relates to apparatus and method for managing and using media used for video surveillance recordings, and in particular, to controlling access to and/or control of the media in order to provide a clear record of the handling of a video recording medium.

2. Description of Related Art

The use of a video cassette recorder (VCR) for security and surveillance has expanded to applications that often require keeping track of a number of video recording media that may be potentially used by a number of people. For example, a police department may install VCRs in patrol cars to record video from video surveillance cameras installed in the cabin of the patrol car.

When a VCR is used to provide a record of events, the date, time and user of the equipment ought to be recorded to validate the recording. Certain applications may dictate that potential users of this equipment may have either full or partial rights to use the equipment.

The routine use of such in-car video systems has led to the need for an efficient way to collect and dispense video tapes (or other video recording media) without the need for additional personnel. In the normal use of such video systems, a supervisor may be in charge of keeping track of the use of video tapes. Careful records need to be maintained in order to record the history of the videotape, including when it was dispensed and returned, by whom and how many times the tape was used.

There is often a need to use video tapes as evidence in a court of law. This may require that an accurate record be maintained of the personnel that handled the tape. This can include persons involved in the installation, recording and removal of the tape from the VCR. In many instances, it is necessary to have different personnel performing these different tasks while still providing a record against possible tampering or falsification. It may be desirable in some instances, that the personnel responsible for inserting or removing the tape is the supervisor of the police officer that made the recording. The time and date of the event and person responsible should be documented to validate that the procedures used in making the recording are acceptable in a court of law.

Keeping track of a large number of video recording media can be difficult and time consuming for supervisors. The supervisors need to have a plan for distributing specific tapes to specific users on a one to one or one to many basis. Also, supervisors must know when to take media out of circulation when they contain critical information that must be preserved. Such preservation includes keeping records of the events on the tape as well as the dates of the events and the particulars of how the tape was handled and by whom. Supervisors must also be prepared to take media out of circulation when the tape has reached a maximum permitted number of service hours.

U.S. Pat. Nos. 4,789,054 and 4,812,629 show vending machines for video cassettes. These machines can respond to identification cards (ID cards) issued to customers and bearing codes such as those found on credit cards. These vending machines have sensors to read codes such as bar codes placed on the individual cassettes. The bar codes can be sensed during delivery and during return of a cassette. These references also disclose a central control with the power to invalidate codes corresponding to specific customers. These references do not describe an interface with a video tape recorder. Also these references do not describe how tapes can be managed to keep a record of persons gaining access to the VCR or the tape.

Refer also to U.S. Pat. Nos. 4,598,810; 4,995,498 and 4,997,076 for similar and related systems. See also U.S. Pat. Nos. 4,789,904; 4,949,186; 5,428,683; and 5,491,464.

U.S. Pat. No. 5,146,495 shows a video tape player that requires the user to key in a valid identification number before the tape player is enabled. This reference does not disclose how the identification number is approved. Also this system has no disclosure of mechanisms for limiting a user's ability to load or eject a tape or any other management procedures used to control access to the tape and various recording capabilities. The reference also does not describe means for keeping records of persons granted access to the tape or the player.

Accordingly, there is a need for an improved methods and apparatus for keeping track of media used for surveillance recordings.

SUMMARY OF THE INVENTION

In accordance with the illustrative embodiments demonstrating features and advantages of the present invention, there is provided a management apparatus for managing transfers of video recording media bearing machine readable registration codes. This media is adapted to record video from a vehicle-mounted camera. The management apparatus includes a user identification key carrying at least one machine readable, identification code. The management apparatus a port means, a registration means, and a processing means. The port means can read the key and provide in response thereto an identification signal corresponding to the identification code. The registration means can read the registration codes borne by the video recording media and can provide in response thereto a registration signal. The processing means is coupled to the port means and the registration means for (a) producing in response to the identification signal, a selection signal signifying an instruction to transfer that one of the video recording media bearing a selected one of the registration codes without requiring an intervening user selection, and (b) verifying and recording the registration signal.

According to another aspect of the invention this management apparatus has an identification key carrying not only a machine readable, identification code, but also a machine readable supplemental code. In this case the port means can not only read the key, but write to the key as well. The port means can also read the key and provide in response thereto a supplemental signal corresponding to the supplemental code. In this case the processing means is again coupled to the port means and the registration means but performs a different class of functions. Specifically, the processing means can (a) record the registration signal, and (b) write the supplemental code through the port means to the identification key.

According to still another aspect of the invention, a management apparatus can manage transfers of video recording media bearing machine readable registration codes. This media is adapted to record video from a vehicle-mounted camera. The management apparatus includes a user identification key carrying a machine readable, identification code, and a machine readable supplemental code. The management apparatus also includes a mobile system and a station system. The mobile system includes a video recording means, a remote port means, and a controller means. The video recording means can record on the video recording media, video from the vehicle-mounted camera. The remote port means can (I) write the supplemental code to the key, and (ii) read the key and providing in response thereto, a remote identification signal corresponding to the identification code. The controller means is coupled to the remote port means and the video recording means for controlling the video recorder in response to the remote identification signal. The station system includes a local port means, a registration means and a processing means. The local port means can read the key and provide in response thereto, a local identification signal and a supplemental signal corresponding to the identification code and the supplemental code. The registration means can read the registration code borne by the video recording media and provide in response thereto a registration signal. The processing means is coupled to the local port means and the registration means for recording the registration signal, the local identification signal, and the supplemental signal.

A method according to a further aspect of the invention can manage transfers of video recording media bearing machine readable registration codes with a user identification key carrying at least one machine readable, identification code. Again, this media is adapted to record video from a vehicle-mounted camera. The method includes the step of reading the key and providing in response thereto an identification signal corresponding to the identification code. Another step is reading the registration codes borne by the video recording media for providing in response thereto a registration signal. The method also includes the step of producing in response to the identification signal a selection signal signifying an instruction to transfer that one of the video recording media bearing a selected one of the registration codes without requiring an intervening user selection. Another step is verifying and recording the registration signal.

Another method according to still another aspect of the invention can locally managing transfers of video recording media bearing machine readable registration codes. The media is adapted to record video in the field from a vehicle-mounted camera. The method employs an identification key carrying a machine readable, identification code, and a machine readable supplemental code. The method includes the step of reading the key locally and providing in response thereto, an identification signal and a supplemental signal corresponding to the identification code and the supplemental code. Another step is locally reading the registration code borne by the video recording media and providing in response thereto a registration signal. The method also includes the steps of locally recording the registration signal, and locally overwriting the supplemental code on the identification key.

A method according to yet another aspect of the invention can locally manage transfers of video recording media bearing machine readable registration codes used for recording video from a vehicle-mounted camera in the field. The method employs a user identification key carrying a machine readable, identification code, and a machine readable supplemental code. The method includes the step of writing the supplemental code to the key in the field. Another step is reading the key in the field and providing in response thereto, a remote identification signal corresponding to the identification code. The method also includes the step of controlling recording onto the video recording media in dependence on the remote identification signal. Another step is reading the key locally and providing in response thereto, a local identification signal and a supplemental signal corresponding to the identification code and the supplemental code. The method also includes the step of reading the registration code borne by the video recording media locally and providing in response thereto a registration signal. Another step of the method is locally recording the registration signal, the local identification signal, and the supplemental signal.

By employing such methods and apparatus, improved management of video recording media is achieved. Preferably, the management techniques would allow identification of a user (such as a police officer) by inserting a "key" into the local system at the station (this system typically employs a personal computer or the like). This key may be an identification card that can be digitally programmed with an identification code and, preferably, other variable codes. The program in the station computer can then offer a choice between taking or returning a tape (or other video recording medium). If a tape was already assigned to the officer, the program can in some cases prompt for return of the outstanding tape and, in the preferred embodiment, will not issue another tape until those outstanding are returned.

When a tape is issued, the program designates a specific tape. The preferred tapes will bear bar codes that may then be read by a bar code reader or similar verification device. The tape number issued to that user (as verified by the bar code reader) may then be written onto the user's key. The user will then proceed to load the tape into the in-car video system. Preferably, the key will be inserted into a receptacle on the in-car video system as a prerequisite to loading a tape. The key may then be read and the tape number stored in memory at the in-car video system. The tape number may also be recorded onto the video tape.

The removal of the tape may be done in a similar fashion. A key may be inserted into the video system. If a tape is already loaded, then the number of the previously loaded tape may be stored on the key along with how much blank time is left, and then this tape is ejected.

The user next proceeds to the local station computer and inserts the key. The user is identified and preferably given the choice of taking or returning a tape. By reading the key, the preferred system knows what tape should be returned and can verify it by scanning the bar code on the tape. The user can also be given the option of returning a tape not originally assigned to the user.

In addition to issuing and returning tapes, the program may also track the use of the tapes. The program can prompt the user to retire a tape after a predetermined number of uses. It can also generate various reports or be exported to popular database or spreadsheet programs.

Once a tape is full, the preferred program will not re-issue it until a preset amount of time has passed. The program could issue the same tape to the officer daily until it has been determined that it lacks sufficient unrecorded space.

In some embodiments, a supervisory key would let a user retire a tape or mark a tape so that it will not be re-issued, as in the case of needing it for evidence. The program would document who and when a tape was retired or stored and for what reason.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
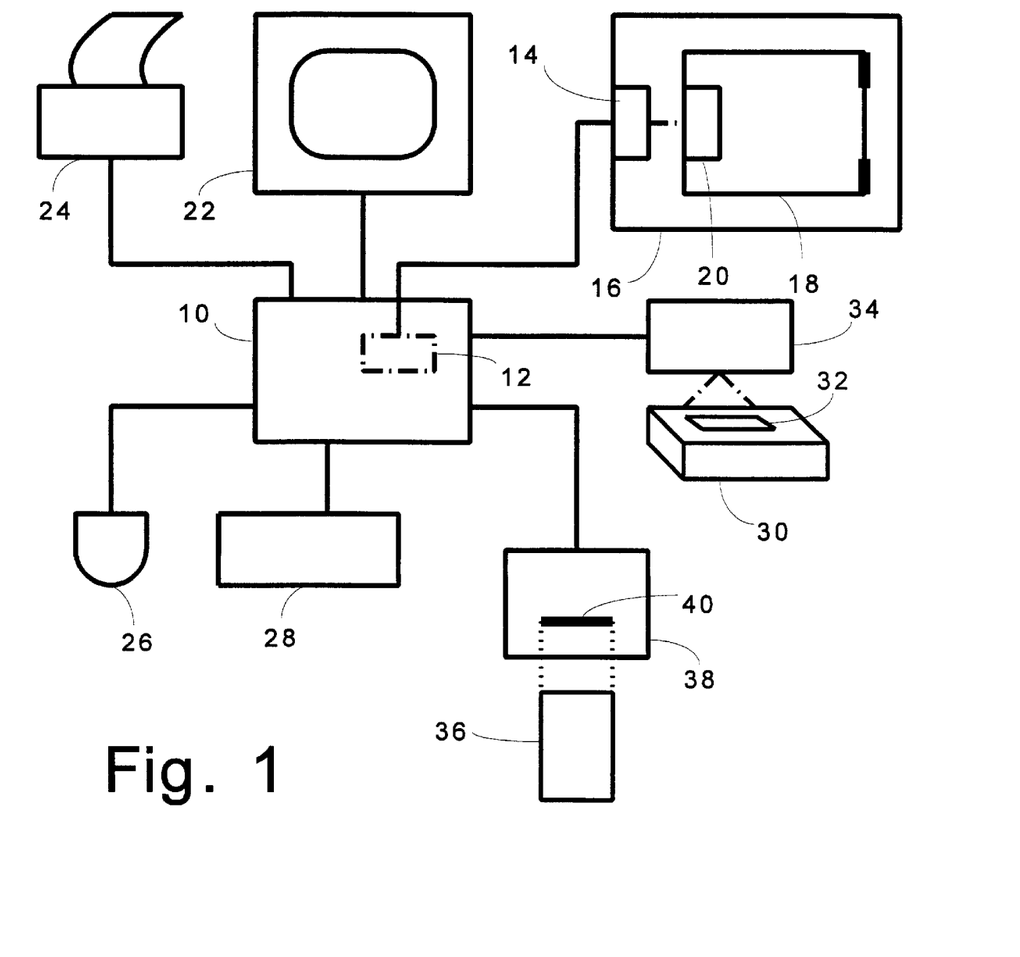
FIG. 1 is a schematic diagram of a station system for management apparatus in accordance with the principles of the present invention.

Referring to FIG. 1, the illustrated station system (part of the management apparatus) has a processing means 10, shown herein as a personal computer, although various other types of computers and microprocessors can be used instead. Computer 10 has a conventional video card to drive a monitor 22, herein referred to as a display means. Computer 10 also has an output port for driving a printer 24. Computer 10 can receive input from a conventional mouse 26 and keyboard 28, which are collectively referred to as manually operable means.

Computer 10 has an internal input/output card 12. Card 12 has drivers that are capable of actuating relays and solenoids. Card 12 is shown connected to a solenoid 14. Solenoid 14 is shown inside a lockable storage means 16. Means 16 may be a steel cabinet with a hinged door that can be secured with a lock 20. Solenoid 14 can operate lock 20 to lock and unlock door 18.

Cabinet 16 is designed to hold a number of video recording medium, such as video tape 30. While video tapes are described, alternate recording media can be used, including digital memory, recordable video discs, etc. Tape 30 has a bar code label 32 bearing a machine readable registration code. While bar codes are described, in some embodiments the code may be contained in a magnetic stripe, grooves in the cassette housing, optically readable characters, etc.

The encoded label 32 on tape 30 can be read by a bar code scanner 34, herein referred to as a registration means. Of course if label 32 does not employ bar codes, then an alternate reader will be used instead. Reader 34 is connected to a communications port of computer 10, although in some embodiments the reader can be directly or indirectly coupled to a data bus in computer 10.

The management apparatus works with a user identification key 36, which is a thin card that can hold an identification code and supplemental code (the purpose of these codes will be described presently). Preferably, key 36 contains a programmable digital memory, although other encoded cards are possible, including cards with magnetic stripes, bar codes, optically readable characters, etc.

Key 36 is inserted into a local port means 38 that can read and write codes to key 36. Port means 38 is connected to a communications port of computer 10, although the device may be coupled in alternate embodiments to the computer's bus, either directly or indirectly.

Port means 38 is preferably a receptacle (for example, a Datakey Slimline™ receptacle), and has electrical contacts used to mate with identification key 36 and thereby form the interface between key 36 and computer 10. In an alternate embodiment, port means 38 may be an optical scanner able to read bar codes printed on a key, although various alternate readers may be employed, such as alternate magnetic card readers, or the like.

Identification key 36 (e.g., a Datakey Slimline™ data carrier) contains an EEPROM that is housed in a plastic case, although other digital memory types can be used instead. An edge of key 36 has contacts that engage reader 38. The EEPROM in key 36 will contain information identifying the user, such as an identification code, name, badge number, etc. This information can be read by computer 10 when the electronic key 36 is inserted into slot 40 of reader 38. Also, the computer 10 can write certain supplemental codes into key 36 at the same time, as will be described presently.

Figure 4:
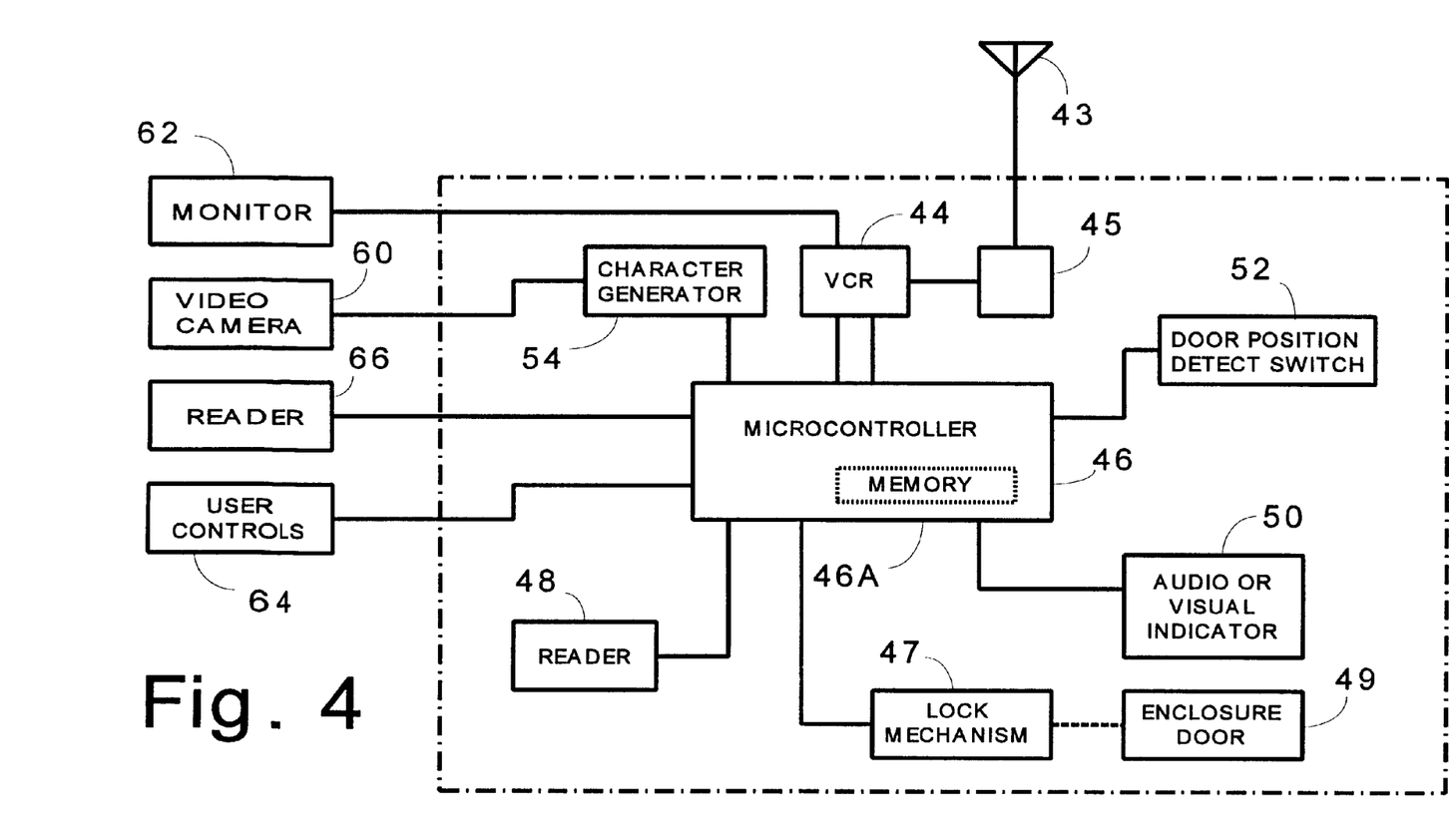
FIG. 4 is a schematic diagram of a mobile system that is part of the management apparatus and cooperates with the station system of FIG. 1.

Referring to FIG. 4, the illustrated mobile system (also part of the management apparatus) is shown with several different units designed for location in different areas within a motor vehicle (not shown), such as a police cruiser. A case 42 may be located in the trunk of that vehicle. An antenna 43 projects from case 10 to receive transmissions as will be described presently.

Case 42 also contains a video recording means, that is, VCR 44, for recording onto a video recording medium, e.g., a video cassette. VCR 44 may be an industrial tape deck, such as a Panasonic model AG-720, AG-5210 or AG-750. The tape deck may have the capability of being controlled by a serial bus line from microcontroller 46 (also referred to as a controller means). Alternatively, a different type of VCR may be used that might require hard wired connections in order to allow control by microcontroller 46.

Monitor 62 (located in the cabin of a vehicle) is shown wired to VCR 44 to display its output. Monitor 62 with an approximately 2-½ inch (6.3 cm) screen is also located in the cabin to allow the user to view the video before and during recording, and during playback. The video camera 60, located in the cabin next to the windshield, is connected through character generator 54 to provide a video input to VCR 44. The character generator 54 is also wired to microcontroller 46 to control the on-screen display. The preferred character generator 54 is a single chip, 128 character, on-screen display microcircuit (preferably an NEC type uPD6450) that is controlled by microcontroller 46 to display status information and produce programming menus, as described further hereinafter. Alternate microcircuits may be employed to produce an on-screen display. Audio transmitted by a wireless microphone (not shown) is received by antenna 43 and detected by receiver 45 to provide an audio track for recording through VCR 44.

Microcontroller 46 (preferably an Intel microcircuit 87C530 or the like), is a single chip, 8-bit microcomputer that is one-time programmable and is used to control system operation. It contains 16K of read only memory (ROM) and 32 input/output lines. In addition, it has a full duplex serial port that can be used to control VCR 44. In other embodiments, different microcontrollers or microcomputers from different manufacturers can be used to control the mobile system.

A reader 48 is mounted to be accessible through an opening in the front of case 42. Reader 48 (also referred to as a remote port means) is designed to read and write to the previously mentioned identification key 36 (FIG. 1). Reader 48 is preferably a device identical to device 38 of FIG. 1.

Inside case 42, microcontroller 46 forms the central control of the system. Control lines of microcontroller 46 connect to the audio alarm 50 and to a lock mechanism 47 for locking and unlocking the door 49 of case 42. A door position detector 52 is employed to provide a signal to microcontroller 46 when door (not shown) to case 42 is closed. The bus line between VCR 44 and microcontroller 46 provides full duplex communication to control the functions of VCR 44. The various system operations are activated based on programming instructions contained in the memory 46A of microcontroller 46.

Audio alarm 50 may be a buzzer device that emits an audible signal to inform the user that an incorrect operation has been performed. Alternatively, the audio alarm 50 may be supplemented with or replaced by a visual indicator, such as an LED.

A user control panel 64 has manually operable controls in the form of buttons used to control the system and the functions of VCR 44. The user control panel 64 with its control buttons is connected to microcontroller 46. The control buttons can command VCR 44 to play, record, fast-forward, rewind or stop. However, different functions can be assigned to these buttons by microcontroller 46.

Another remote port means, shown herein as a reader 66 (located in the vehicle cabin), is connected directly to microcontroller 46. This allows microcontroller 46 to access the information contained in any electronic key that may be inserted into reader 66 and enable microcontroller 46 to reprogram the electronic key 56. Reader 66 allows special operations upon insertion of an identification key.

To facilitate an understanding of the principles associated with the foregoing apparatus, its operation will be briefly described. In operation, computer 10 will be initially powered and proceed through a startup phase shown as step S-1 in FIG. 2. Thereafter, the program of computer 10 awaits insertion of identification key 36, in the standby mode of step S-2.

Figure 2:
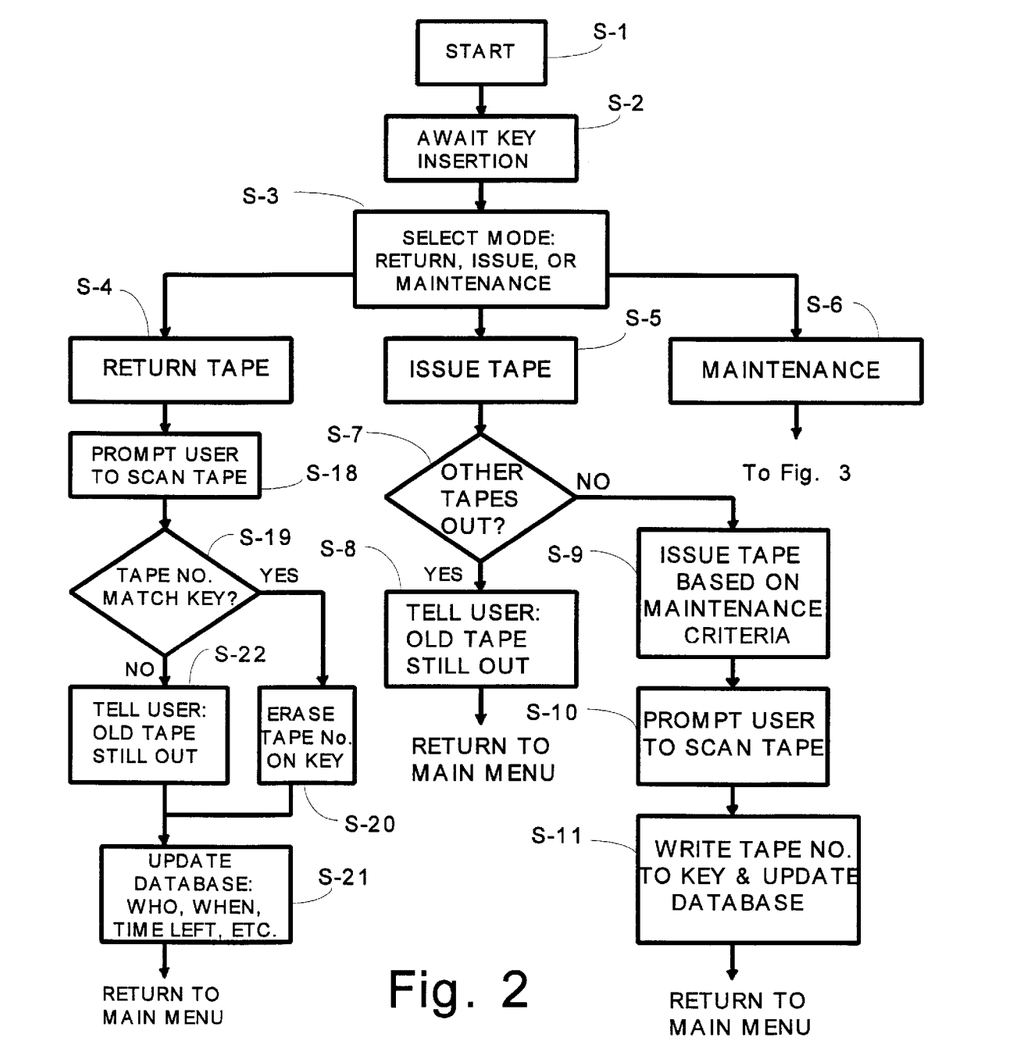
FIG. 2 is a flowchart describing methods performed by a program in the processing means of FIG. 1.

After key 36 is cleared, the program displays on monitor 22 a prompt, requesting the user to select a desired mode. Specifically, the user is asked in step S-3 to select entry into either: the returning mode of step S-4, the issuing mode of step S-5, or the maintenance mode of step S-6.

By using mouse 26 or keyboard 28 in the usual fashion, a user can select the issuing mode and enter this mode, as indicated by step S-5. In succeeding step S-7, computer 10 performs a check on whether the user still possesses an unreturned tape.

Upon insertion of identification key 36, computer 10 senses this insertion and reads the identification code stored on key 36 to determine whether that code is valid and authorized. Specifically, computer 10 searches its records to verify that this number has been properly assigned. Also at this time, computer 10 will read certain supplemental codes that may be contained on identification key 36. As explained further hereinafter, these supplemental codes may have been previously written by equipment in the field to indicate information about tapes coming into the possession of the key holder.

Computer 10 can determine whether the supplemental code found on this user's key 36 indicates this user still has possession of a tape. Also, computer 10 can search its database to determine whether its records show that a tape was issued to this user without being returned. For a system maintaining minimal controls, computer 10 will simply display a warning on monitor 22 if the outstanding tape has yet to be returned. In this embodiment, however, the user is informed in step S-8 that further tapes will not be issued until the outstanding tapes are returned. Control then returns to the standby mode of step S-2.

If however, this user does not have an outstanding tape, in step S-9 computer 10 will select a tape from its inventory and request on monitor 22 that the user take this specific tape. Computer 10 selects a tape based on preprogrammed criteria. In some installations the program will assign one specific tape to one specific user. This one to one relationship may be established in a lookup table stored in computer memory. In other installations the program may allow a specific tape to be successively assigned to one of a limited number of users. Again, this one to many relationship can be preprogrammed.

As explained further hereinafter, some tapes may be disqualified for various reasons. For example, a tape that has been issued more than a maximum permitted number of times may be declared too worn for further use. In other cases the tape may have been marked for removal from circulation during the last return mode or the maintenance mode, as will be described presently.

In any event, after the authorized tape number is displayed on monitor 22, computer 10, acting through card 1 2, activates solenoid 14 to open lock 20 (FIG. 1). The user then takes the specified tape from storage means 16 and closes door 18. Computer 10 can detect the opening and closing of door 18 through operation of switch 52. In other embodiments, door detection will not be employed and in fact, some embodiments will not use a controlled lock.

Monitor 22 will now request the user to place tape 30 at the bar code reader 34. Next, reader 34 will scan the code on label 32 and send this encoded information to computer 10. As indicated by step S-10 (FIG. 2), computer 10 will then confirm that the tape being scanned is in fact the tape specified by the program. If the wrong tape was taken from cabinet 16, computer 10 will send a warning to monitor 22, requesting the user to select the correct tape.

Once the correct tape 30 is scanned at reader 34, in step S-11 computer 10 will store in its database the identification code of this user together with the number of the tape being issued. Also at this time, computer 10 will write a supplemental code through interface 38 (FIG. 1) to identification key 36. This supplemental code will include the number of the tape just issued. In some embodiments additional information can be written, such as the date and time of issuance and other pertinent data (e.g., amount of tape left, as determined by steps to be described presently). Thereafter, the program locks the cabinet 16 and returns to the standby mode of step S-2 to await further instructions. The user may now retrieve the identification key 36 and leave.

A user will now typically take the tape to a vehicle having the equipment shown in FIG. 4. The user will insert the identification key into reader 48. When this insertion is sensed by microcontroller 46, it leaves the standby mode of step S-12 (FIG. 5) to perform an authorization check in step S-13. At this time, the key's identification code is compared to authorized codes stored in computer memory. Also at this time, computer 46 will read the supplemental codes contained on the identification key (key 36 of FIG. 1), which typically includes the number of the tape issued to the key holder. Microcontroller 46 can also read from key 36 encoded information indicating the amount of time recorded (or left) on the tape.

If the identification code is invalid, a warning signal is issued through indicator 50 and the program returns to the standby mode of step S-12. If the user is authorized, the program determines in step S-14 whether a tape is already loaded in VCR 44. If the VCR is free, lock mechanism 47 will unlock door 49, and the program will allow loading of a new tape into VCR 44. In step S-15 the program fast forwards the recently loaded tape a small amount and then records the tape number obtained in step S-13 onto the tape. This recording is performed in step S-16 by issuing a display command through character generator 54 (FIG. 4), which then overlays the tape number on the video from camera 60 for recording by VCR 44 onto the tape. Recording a tape number will permit later confirmation that the tape is an original, since a copy would bear on its label a different tape number than that recorded on the tape. Also at this time, the VCR 44 working through character generator 54, will record the identity of the user by recording on tape the user identification number and/or the name of the user. Also, the date and time can be recorded onto the tape at this time. Finally, the user will remove the identification key from reader 38 and computer 46 will lock door 49.

Figure 5:
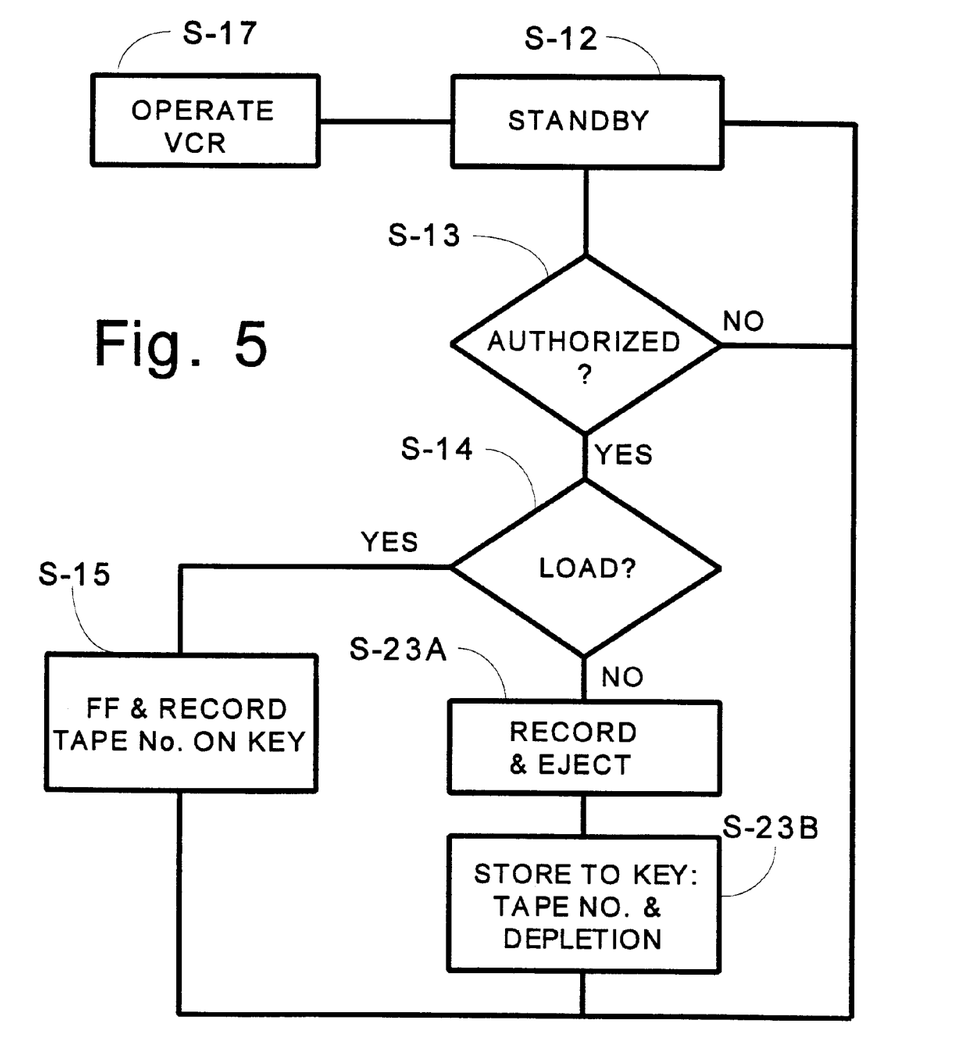
FIG. 5 is a flowchart describing methods performed by a program in the microcontroller of FIG. 4.

The VCR 44 may now be used for its intended purpose by using controls on panel 64, as indicated by step S-17 (FIG. 5). If used in a police patrol vehicle, the VCR 44 can be used to record various incidents that occur on a shift. As the tape is recorded during the shift, microcontroller 46 keeps track of this expended time in order to update information about the time left on this tape.

At the end of a shift, the user can insert key 36 into reader 48 (FIG. 4). Such insertion causes the program to execute step S-13 (FIG. 5). As before, the program determines whether the identification code on the key is on a list of authorized codes. If authorized, the program determines in step S-14 whether a tape is already loaded in VCR 44. In this case, a tape has already been loaded, which causes execution of step S-23A. Specifically, the tape in VCR 44 will be recorded with brief messages indicating the date and time of ejection and the identification code and/or name of the user requesting ejection of the tape.

Next in step S-23B microcontroller 46 writes through interface 48 to identification key 36, a supplemental code indicating the number of the tape, as well as the amount of time recorded on the tapes (alternatively, the microcontroller 46 can record the amount of time left on the tape.

The tape is ejected and the user removes the identification key 36 from the reader 48, allowing the program to return to the standby mode in step S-12. Eventually the user will return the tape to the station system shown in FIG. 1. As before, the user will insert the identification key 36 in reader 38. If the user were to request issuance of a new tape, steps S-7 and S-8 would prevent such issuance. Instead, the user will typically select the returning mode of step S-4 (FIG. 2). Computer 10 will then prompt the user in step S-18 through monitor 22 to scan the label 32 on tape 30. Accordingly, the user will place tape 30 next to the scanner 34, which will then read the bar codes on label 32. This encoded information will be sent to computer 10 and analyzed in step S-19.

Computer 10 will read the supplemental code on key 36 to determine if the tape number indicated on that key matches the code just read on the label 32 of tape 30. If these match the supplemental code on key 36 indicating tape number, will be erased in step S-20. Otherwise, the user will be notified in step S-22 that the tape indicated on the user's key 36 has yet to be returned. In any event, the user will be permitted to return this tape even if it does not match the supplemental code found on the identification key 36.

In step S-21 the program will update its database with the particulars of the tape being returned. The database will be updated to include the date, time, tape number, identity of person returning the tape, etc. Also at this time, the program will examine other supplemental codes found on identification key 36. For example, the key may indicate the amount of time recorded on tape 30 (or the time left). This information about tape depletion will be stored in the computer database to be used in various ways. When this tape is next issued, the key of the new user will be supplied with information about the time already recorded on this tape. If however, the amount of time left on this tape is too small, the program will stop dispensing this tape.

At this time, the program can request additional information from the user. The user can be requested to complete a form that is displayed on monitor 22. For example, the user can be asked whether there is special evidence contained on this tape. The user can supply a brief description, giving summons numbers, etc. If the information on the tape is designated critical, the program will stop dispensing this tape, since it must be preserved for evidence in a potential future court proceeding. The user can also supply additional information, such as the number of events on the tape, the area patrolled, the officers involved with this tape, and any other information deemed significant by the user or the supervisor who designs the information form.

The user is then prompted to return the tape to the storage means 16 and the solenoid 14 may operate lock 20 for this purpose. Once the tape is stored and locked, the user may retrieve the identification key 36, at which time the program returns to the standby mode of step S-2.

Figure 3:
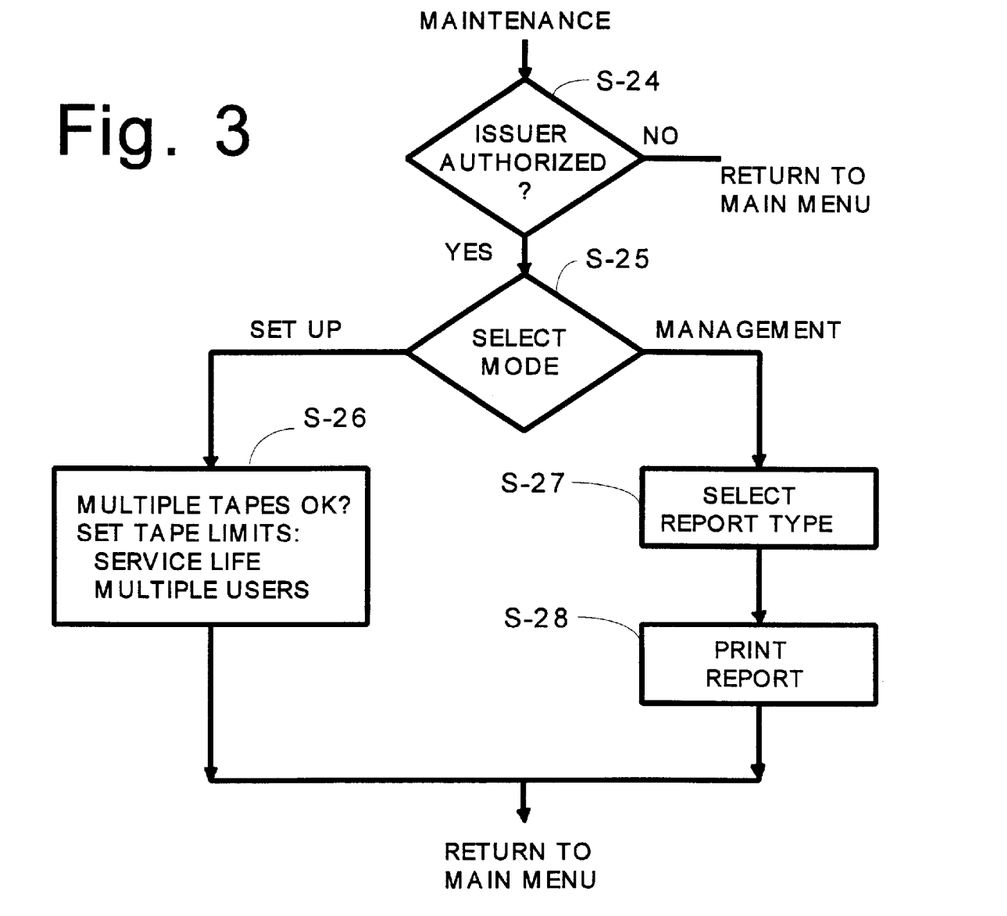
FIG. 3 is another flowchart associated with the flowchart of FIG. 2.

A supervisor may also access the station system of FIG. 1 by inserting a key in reader 38. At step S-3, the supervisor can select the maintenance mode of step S-6. Referring to FIG. 3, the identification code of the supervisor is examined in step S-24. If this identification code does not have the necessary clearance, control is then returned to the standby mode (step S-2 of FIG. 2). Otherwise, the supervisor is given the option in step S-25 of entering either a set up mode or a management report mode.

In the set up mode of step S-26, the supervisor can specify certain limits on the distribution of tapes. The supervisor can explicitly retire a tape that is known to be worn or contain critical evidence. At this time the supervisor can set limits on the number of tapes that a user may receive. For example, a user may only be allowed to possess a single tape, so that all tapes must be returned before another will be issued. The supervisor can also specify here the number of times or the length of time that a tape may be in service before it must be retired.

In this mode the supervisor can specify what identification codes are valid and can correlate them to tapes that will be issued to that code. Also in this mode, a supervisor can program new identification keys by writing a new identification code on the key. Furthermore, the supervisor can design a table that correlates each prospective user with the tapes in inventory. For example, the table can be arranged to allow only one specified tape to be issued to a specific user, that is, a one to one correlation. Alternatively, each tape can be designated for use by one of a specified number of prospective users.

The supervisor can also select the management report mode of step S-27. Here the supervisor can select the type of data to be reported. The supervisor can specify certain criteria to select the records that will be in the report. Once the report is designed and the records selected, the report is printed in step S-28, using printer 24 (FIG. 1). Thereafter, the program returns to the standby mode of step S-2 of FIG. 2.

It will be appreciated that various modifications may be implemented with respect to the above described, preferred embodiments. In some embodiments, the illustrated station system can have fewer accessories or different accessories than that shown. Also, some embodiments will not have a mobile system of the type herein described, but will use a conventional mobile system that will not read or write codes onto an identification key. In this latter instance, the station system is used solely to control issuance of tapes, without exchanging data with equipment in the field. Also, some embodiments will have identification keys that only bear an identification code and no supplemental codes. Moreover, the programming steps illustrated herein can be reduced or supplemented, depending upon the desired complexity or simplicity of the system. Furthermore, the steps can be performed in different orders in alternate embodiments.

Obviously, many modifications and variations of the present invention are possible in light of the above teachings. It is therefore to be understood that within the scope of the appended claims, the invention may be practiced otherwise than as specifically described.

We claim:

1. A management apparatus for managing transfers of video recording media bearing machine readable registration codes, said media being adapted for recording video from a vehicle-mounted camera, said management apparatus comprising:
   a user identification key carrying at least one machine readable, identification code;
   a port means for reading said key and providing in response thereto an identification signal corresponding to said identification code;
   a registration means for reading the registration codes borne by said video recording media and for providing in response thereto a registration signal; and
   processing means coupled to said port means and said registration means for (a) producing in response to said identification signal a selection signal signifying an instruction to transfer that one of said video recording media bearing a selected one of said registration codes without requiring an intervening user selection, and (b) verifying and recording said registration signal.

2. A management apparatus according to claim 1 comprising:
   a lockable storage means coupled to said processing means for storing video recording media, said processing means being operable to unlock said storage means in response to said identification signal corresponding to one of a predetermined plurality of authorized codes stored in said processing means.

3. A management apparatus according to claim 1 wherein said processing means is operable to record said identification signal.

4. A management apparatus according to claim 1 wherein said processing means is operable to produce in response to said identification signal a selection signal signifying an instruction to transfer that one of said video recording media bearing one of said registration codes selected according to a predetermined table.

5. A management apparatus according to claim 4 wherein said predetermined table correlates the registration codes to said identification signal on a one to one basis.

6. A management apparatus according to claim 4 wherein said predetermined table correlates the registration codes to said identification signal on a one to many basis.

7. A management apparatus according to claim 3 wherein said processing means is operable to tally transfers for each of the registration codes and to stop issuing the selection signal for the registration codes of the media that were transferred more than a predetermined number of times.

8. A management apparatus according to claim 3 wherein said processing means includes:
   manually operable means for producing user signals; and
   display means for displaying information.

9. A management apparatus according to claim 8 wherein said processing means is operable (a) to display on said display means an archiving prompt requesting information on appropriateness of archiving a just returned one of said media, and (b) to stop issuing, at least temporarily, the selection signal for the registration code of the just returned one of the media in response to the user signal signifying an affirmative indication after said archiving prompt.

10. A management apparatus according to claim 9 wherein said archiving prompt calls for (a) a multiple choice, and (b) text entry.

11. A management apparatus according to claim 8 wherein said processing means is operable to (a) display on said display means an information prompt requesting information on any summons issued in connection with events recorded on a just returned one of said media, and (b) record the user signal next produced.

12. A management apparatus according to claim 8 wherein said processing means is operable to (a) display on said display means an information prompt requesting information on the number of events recorded on a just returned one of said media, and (b) record the user signal next produced.

13. A management apparatus according to claim 8 wherein said processing means is operable to display on said display means a directing prompt requesting placement at said registration means of that one of said media bearing the selected one of said registration codes, for verification purposes.

14. A management apparatus according to claim 13 wherein said processing means is operable to record as a combination the identification signal last received and the registration signal next received after said directing prompt.

15. A management apparatus according to claim 13 wherein said processing means is operable to record as a combination the registration signal next received after said directing prompt and the date and time of receipt.

16. A management apparatus according to claim 8 wherein said processing means is operable to display on said display means a directing prompt requesting placement of a returning one of the media at said registration means for reading its registration code.

17. A management apparatus according to claim 16 wherein said processing means is operable to record as a combination the identification signal last received and the registration signal next received after said directing prompt.

18. A management apparatus according to claim 17 wherein said processing means is operable to record as a combination the registration signal next received after said directing prompt and the date and time of receipt.

19. A management apparatus according to claim 17 wherein after the directing prompt said processing means is operable, for the registration signal next received, to record together both its value and how many times it is recorded.

20. A management apparatus according to claim 16 wherein said processing means is operable to display on said display means a warning in response to the registration signal from the registration means for the returning one of the media failing to match the last issued one of the registration codes recorded in connection with the identification code just read by said port means, so that users are warned of returns inconsistent with their last taking.

21. A management apparatus according to claim 8 wherein said processing means is operable to display on said display means a prompt to select as an activity either an issuance or return of one of said video recording media, said manually operable means being operable to produce said user signal in order to signify a response to the prompt.

22. A management apparatus according to claim 21 wherein said processing means is operable to display on said display means a warning in response to the user signal signifying a request to issue one of said video recording media, if a prior verified request to issue was not followed by a verified request to return, so that users are warned about possessing more than one of the video recoding media at a time.

23. A management apparatus according to claim 15 wherein said processing means is operable to produce an output signal signifying data recorded in response to the identification signal.

24. A management apparatus for managing transfers of video recording media bearing machine readable registration codes, said media being adapted for recording video from a vehicle-mounted camera, said management apparatus comprising:

an identification key carrying a machine readable, identification code, and a machine readable supplemental code;

a port means for (a) writing to said key, and (b) reading said key and providing in response thereto, an identification signal and a supplemental signal corresponding to said identification code and said supplemental code;

a registration means for reading the registration code borne by said video recording media and providing in response thereto a registration signal; and processing means coupled to said port means and said registration means for (a) recording said registration signal, and (b) writing said supplemental code through said port means to said identification key.

25. A management apparatus according to claim 24, wherein said processing means is operable to write the supplemental code to correspond to said registration signal.

26. A management apparatus according to claim 24, wherein said processing means is operable (a) during an issuing mode to write the supplemental code to correspond to said registration signal, and (b) during a returning mode to provide a warning signal if said supplemental signal does not correspond to said registration signal, so that a warning is given if the media being returned is different than that last issued.

27. A management apparatus according to claim 24, wherein said processing means is operable: (a) during a returning mode to overwrite the supplemental code to cancel, if present, a value signifying issuance of an outstanding one of the media, (b) during an issuing mode to write the supplemental code with a value signifying issuance of a now outstanding one of the media, and (c) during an issuing mode to provide a warning signal if the supplemental code already contains a value signifying issuance of an outstanding one of the media, so that a warning is given if another one of the media is being requested before returning those outstanding.

28. A management apparatus for managing transfers of video recording media bearing machine readable registration codes, said media being adapted for recording video from a vehicle-mounted camera, said management apparatus comprising:

a user identification key carrying a machine readable, identification code, and a machine readable supplemental code;

a mobile system comprising:
  (a) a video recording means for recording on the video recording media video from the vehicle-mounted camera;
  (b) a remote port means for (I) writing said supplemental code to said key, and (ii) reading said key and providing in response thereto, a remote identification signal corresponding to said identification code; and
  (c) a controller means coupled to said remote port means and said video recording means for controlling said video recorder in response to said remote identification signal; and a station system comprising:
  (a) a local port means for reading said key and providing in response thereto, a local identification signal and a supplemental signal corresponding to said identification code and said supplemental code;
  (b) a registration means for reading the registration code borne by said video recording media and providing in response thereto a registration signal; and
  (c) processing means coupled to said local port means and said registration means for recording said registration signal, said local identification signal, and said supplemental signal.

29. A management apparatus according to claim 28 wherein said mobile system is operable to monitor depletion of the video recoding media and write said supplemental code to said key to signify prevailing depletion of said video recording media.

30. A management apparatus according to claim 29 wherein said processing means is operable in a returning mode to evaluate contemporaneous values of said supplemental signal and said registration signal and to produce a signal signifying an order to stop circulating that one of said video recording media corresponding to the registration code just received if the supplemental signal corresponds to depletion beyond a predetermined limit.

31. A management apparatus according to claim 28 wherein said local port is operable to write the supplemental code to said key, said processing means being operable in an issuing mode to write the supplemental code through said local port to signify a last received value of said registration signal.

32. A management apparatus according to claim 28, wherein said processing means is operable (a) during an issuing mode to write the supplemental code to correspond to said registration signal, and (b) during a returning mode to provide a warning signal if said supplemental signal does not correspond to said registration signal, so that a warning is given if the media being returned is different than that last issued.

33. A management apparatus according to claim 28, wherein said processing means is operable: (a) during a returning mode to overwrite the supplemental code to cancel, if present, a value signifying issuance of an outstanding one of the media, (b) during an issuing mode to write the supplemental code with a value signifying issuance of a now outstanding one of the media, and (c) during an issuing mode to provide a warning signal if the supplemental code already contains a value signifying issuance of an outstanding one of the media, so that a warning is given if another one of the media is being requested before returning those outstanding.

34. A method for managing transfers of video recording media bearing machine readable registration codes with a user identification key carrying at least one machine readable, identification code, said media being adapted for recording video from a vehicle-mounted camera, said method including the steps of:

reading said key and providing in response thereto an identification signal corresponding to said identification code;

reading the registration codes borne by said video recording media for providing in response thereto a registration signal;

producing in response to said identification signal a selection signal signifying an instruction to transfer that one of said video recording media bearing a selected one of said registration codes without requiring an intervening user selection; and verifying and recording said registration signal.

35. A method according to claim 34 employing a lockable storage device for storing video recording media, the method including the step of:

unlocking said storage means in response to said identification signal corresponding to one of a predetermined plurality of authorized codes.

36. A management apparatus according to claim 34 comprising the step of:

recording said identification signal.

37. A method according to claim 34 comprising the step of:

producing in response to said identification signal a selection signal signifying an instruction to transfer that one of said video recording media bearing one of said registration codes selected according to a predetermined table.

38. A method according to claim 37 wherein said predetermined table is prepared to correlate the registration codes to said identification signal on a one to one basis.

39. A method according to claim 37 wherein said predetermined table is prepared to correlate the registration codes to said identification signal on a one to many basis.

40. A method according to claim 36 comprising the steps of:

tallying transfers for each of the registration codes; and ceasing issuance of the selection signal for the registration codes of the media that were transferred more than a predetermined number of times.

41. A method according to claim 36 comprising the steps of:

displaying an archiving prompt requesting information on appropriateness of archiving a just returned one of said media; and ceasing issuance, at least temporarily, of the selection signal for the registration code of the just returned one of the media in response to a user giving an affirmative indication after said archiving prompt.

42. A method according to claim 41 wherein said archiving prompt is performed by requesting (a) a reply to a multiple choice, and (b) text entry.

43. A method according to claim 36 comprising the steps of:

displaying an information prompt requesting information on any summons issued in connection with events recorded on a just returned one of said media; and recording a user response to the information prompt.

44. A method according to claim 36 comprising the step of:

displaying an information prompt requesting information on the number events recorded on a just returned one of said media; and recording a reply to the information request.

45. A method according to claim 36 comprising the step of:

displaying a directing prompt specifying a positioning of that one of said media bearing the selected one of said registration codes for verification purposes.

46. A method according to claim 45 comprising the step of:

recording as a combination the identification signal last received and the registration signal next received after said directing prompt.

47. A method according to claim 45 comprising the step of:

recording as a combination the registration signal next received after said directing prompt and the date and time of receipt.

48. A method according to claim 36 comprising the steps of:

displaying a directing prompt specifying a positioning of a returning one of the media; and reading the registration code of the returning one of the media.

49. A method according to claim 48 comprising the step of:

recording as a combination the identification signal last received and the registration signal next received after said directing prompt.

50. A method according to claim 49 comprising the step of:

recording as a combination the registration signal next received after said directing prompt and the date and time of receipt.

51. A method according to claim 49 comprising the step of:

for the registration signal next received, recording together both its value and how many times it is recorded.

52. A method according to claim 48 comprising the step of:

displaying a warning if the registration code for the returning one of the media fails to match the last issued one of the registration codes recorded in connection with the identification signal just received, so that users are warned of returns inconsistent with their last taking.

53. A method according to claim 36 comprising the steps of:

displaying a prompt to select as an activity either an issuance or return of one of said video recording media; and awaiting a reply.

54. A method according to claim 53 comprising the step of:

displaying a warning if a user signifies a request to issue one of said video recording media, when a prior verified request to issue was not followed by a verified request to return, so that users are warned about possessing more than one of the video recording media at a time.

55. A method for locally managing transfers of video recording media bearing machine readable registration codes, said media being adapted for recording video in the field from a vehicle-mounted camera, and employing an identification key carrying a machine readable, identification code, and a machine readable supplemental code, the method including the steps of:

reading said key locally and providing in response thereto, an identification signal and a supplemental signal corresponding to said identification code and said supplemental code;

locally reading the registration code borne by said video recording media and providing in response thereto a registration signal;

locally recording said registration signal; and locally overwriting said supplemental code on said identification key.

56. A method for locally managing transfers of video recording media bearing machine readable registration codes used for recording video from a vehicle-mounted camera in the field, and employing a user identification key carrying a machine readable, identification code, and a machine readable supplemental code, the method comprising the steps of:

writing said supplemental code to said key in the field;

reading said key in the field and providing in response thereto, a remote identification signal corresponding to said identification code;

controlling recording onto said video recording media in dependence on said remote identification signal;

reading said key locally and providing in response thereto, a local identification signal and a supplemental signal corresponding to said identification code and said supplemental code;

reading the registration code borne by said video recording media locally and providing in response thereto a registration signal; and locally recording said registration signal, said local identification signal, and said supplemental signal.

57. A method according to claim 56 comprising the steps of:

monitoring depletion of the video recoding media in the field; and writing said supplemental code to said key to signify prevailing depletion of said video recording media.

58. A method according to claim 57 comprising the steps of:

in a returning mode, locally evaluating contemporaneous values of said supplemental signal and said registration signal; and producing a signal signifying an order to stop circulating that one of said video recording media corresponding to the registration code just received if the supplemental signal corresponds to depletion beyond a predetermined limit.

59. A method according to claim 56 comprising the steps of:

locally writing the supplemental code to said key; and in an issuing mode, locally writing the supplemental code to said key to signify a last received value of said registration signal.

60. A method according to claim 56 comprising the steps of: wherein said processing means is operable (a) during an issuing mode to write the supplemental code to correspond to said registration signal, and (b) during a returning mode to provide a warning signal if said supplemental signal does not correspond to said registration signal, so that a warning is given if the media being returned is different than that last issued.

61. A method according to claim 56 comprising the steps of:

during a returning mode, overwriting the supplemental code of the key to cancel, if present, a value signifying issuance of an outstanding one of the media;

during an issuing mode, providing a warning signal if the supplemental code of the key already contains a value signifying issuance of an outstanding one of the media, so that a warning is given if another one of the media is being requested before returning those outstanding; and during an issuing mode, writing the supplemental code to the key with a value signifying issuance of a now outstanding one of the media.

* * * * *